May 9, 1961 B. A. ROBBINS ET AL 2,983,265
MEANS FOR INCREASING THE POWER OUTPUT OF NATURALLY
ASPIRATED INTERNAL COMBUSTION ENGINES
Filed Feb. 15, 1955 3 Sheets-Sheet 1
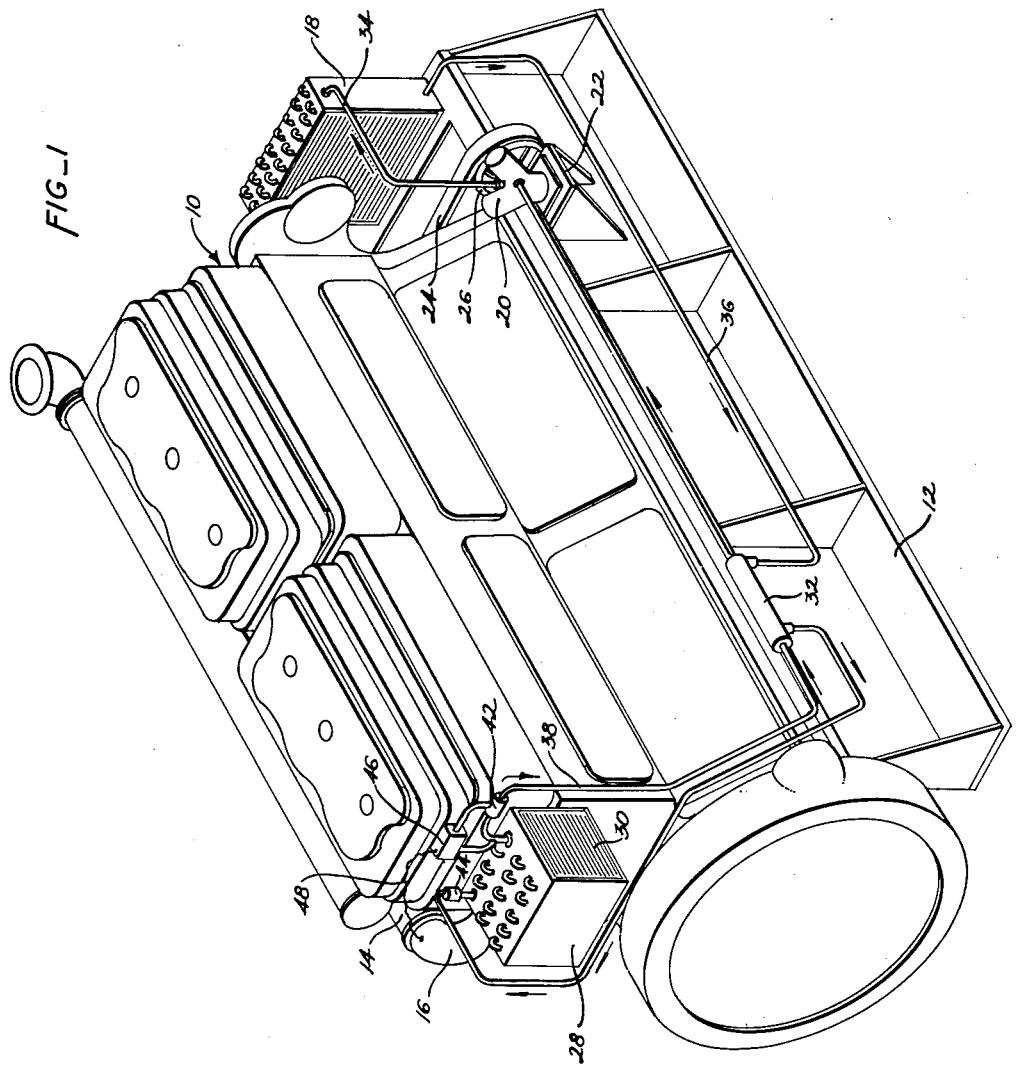
INVENTORS
BRUCE A. ROBBINS
ALFRED R. FLEISCHER
BY Taylor & Neal
ATTORNEYS

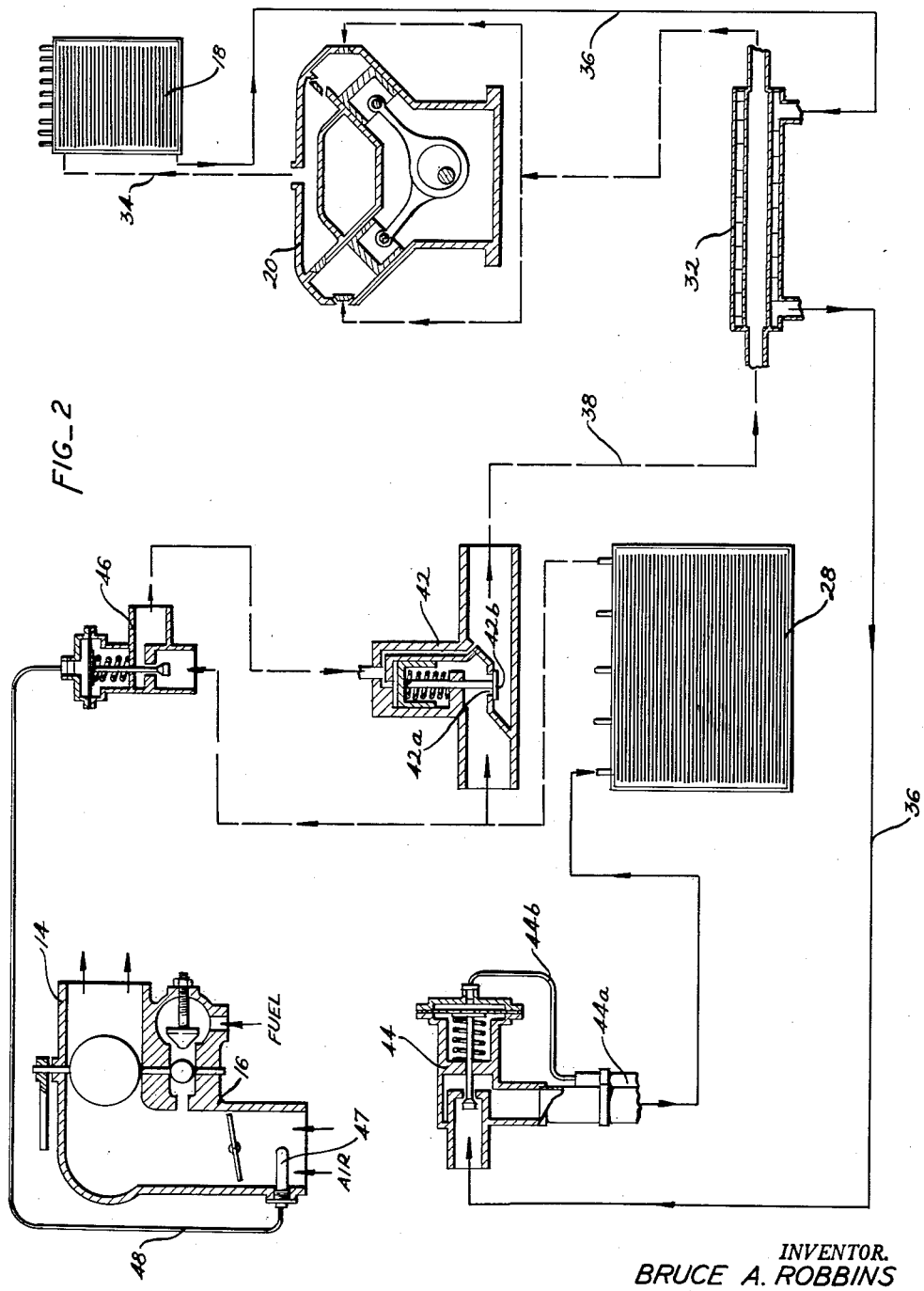

May 9, 1961 B. A. ROBBINS ET AL 2,983,265
MEANS FOR INCREASING THE POWER OUTPUT OF NATURALLY
ASPIRATED INTERNAL COMBUSTION ENGINES
Filed Feb. 15, 1955 3 Sheets-Sheet 3
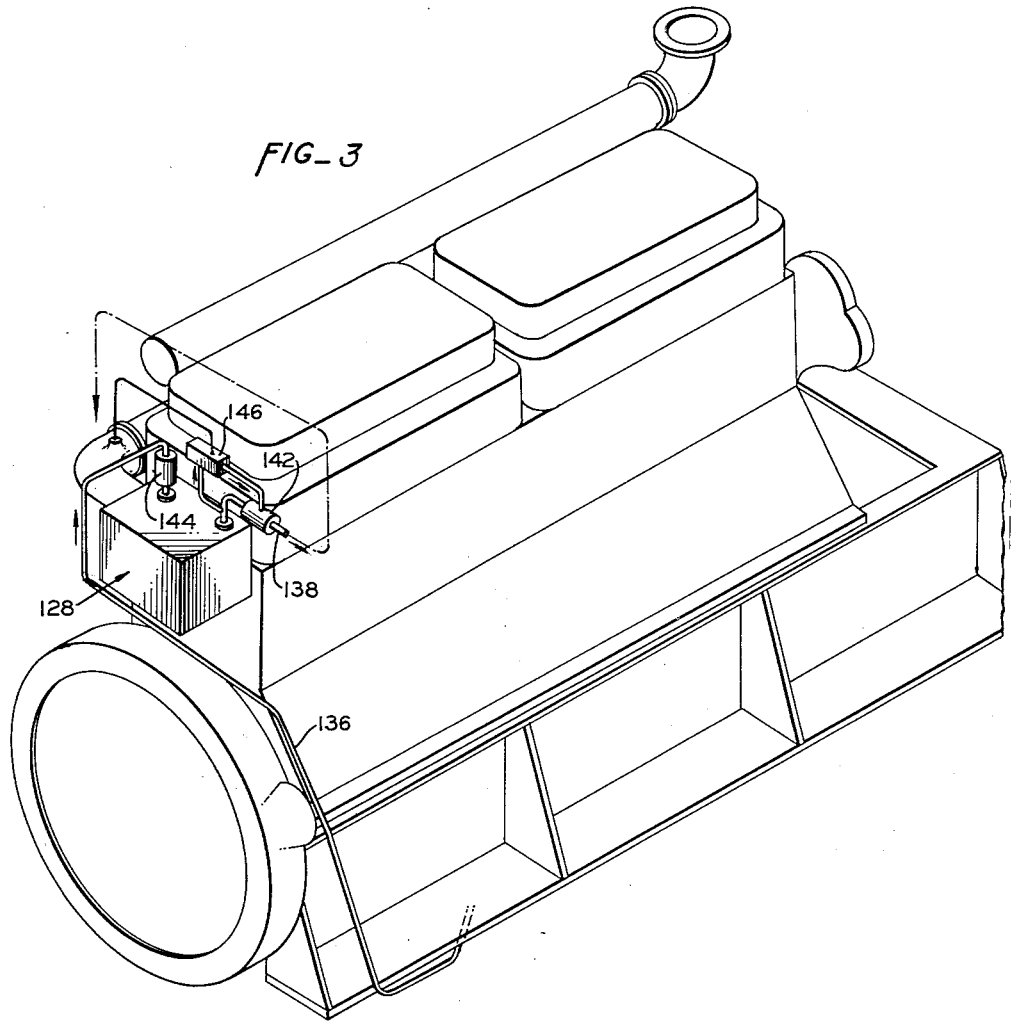
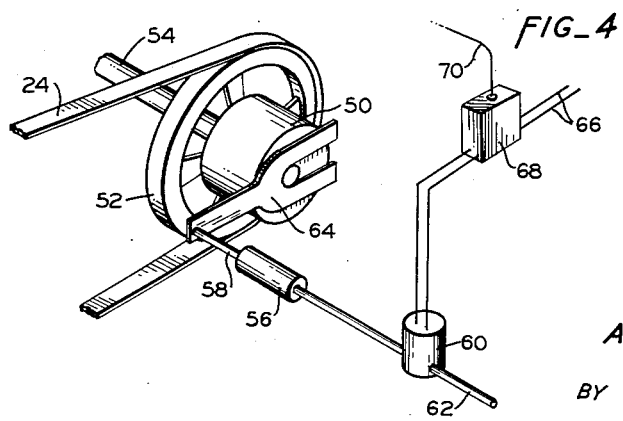
INVENTOR.
BRUCE A. ROBBINS
ALFRED R. FLEISCHER
BY Naylor & Neal
ATTORNEYS United States Patent Office 2,983,265
Patented May 9, 1961

2,983,265

MEANS FOR INCREASING THE POWER OUTPUT OF NATURALLY ASPIRATED INTERNAL COMBUSTION ENGINES

Bruce A. Robbins, Walnut Creek, and Alfred R. Fleischer, Concord, Calif., assignors to The Enterprise Division of General Metals Corporation, San Francisco, Calif., a corporation of California Filed Feb. 15, 1955, Ser. No. 488,312

6 Claims. (Cl. 123—119)

This invention relates to internal combustion engines, and more particularly to means for enabling a naturally aspirated internal combustion engine to operate at a constant and higher than normal horsepower output.

An object of the invention is to provide a naturally aspirated internal combustion engine with temperature control means for the intake air, whereby the temperature of the intake air may be reduced to a predetermined value regardless of the ambient temperature condition of the air.

A further object of the invention is to provide a naturally aspirated internal combustion engine with means for increasing the amount of intake air fed into the engine without converting the engine to one of the pressure-charged type.

Still a further object of the invention is to provide an internal combustion engine with an efficient, economical and compact system for increasing the amount of combustion air fed into the engine.

We are well aware that it is old in the engine art to increase the amount of combustion air fed into an engine by compressing the intake air so that the air has an increased weight per unit volume. Since the resultant higher temperature intake air lowers the rated horsepower output and contributes to pre-ignition of the combustion mixture, aftercooling is normally utilized to reduce the temperature of the intake air after leaving the pressure charger and before entering the intake manifold of the engine. The present invention is based on an entirely different concept in that the density of the intake air is increased by pre-cooling the intake air rather than by compressing it. Such pre-cooling is achieved by means of the evaporator element of a refrigeration unit. The refrigeration unit thus supplants both the pressure charger and the aftercooler conventionally employed, and at the same time the engine remains one of the naturally aspirated type. Furthermore, the cost of the refrigeration unit is nominal in comparison with the expense involved in employing pressure chargers and aftercoolers.

Other objects and advantages of the invention will be apparent from the following description taken in conjunction with the drawings forming part of this specification, and in which:

Figure 1 is a perspective view of an internal combustion engine embodying means for reducing the temperature of the intake air therefor;

Figure 2 is a semi-schematic view showing in detail the elements of the intake refrigerating system of Figure 1;

Figure 3 is a perspective view of an internal combustion engine illustrating a modified form of intake air refrigerating system adapted for use when the engine is operated on liquified gas; and Figure 4 is a semi-schematic showing in perspective of a clutch arrangement responsive to the temperature condition of the intake air to the engine and operable to driveably connect the compressor of Figure 1 to the engine and to disconnect the compressor from the engine.

With reference to the drawing, the internal combustion engine 10, which is mounted on support frame 12 and provided with an air intake manifold 14 and a carburetor 16 connected thereto, is provided with an air intake refrigeration system comprising; a condenser 18, which may be air or water cooled, mounted on the support frame 12 forwardly of the engine; a refrigerant compressor 20 mounted on platform means 22 secured to support frame 12 and adapted to be driven by the engine 10 through means comprising an engine driven belt 24 and a sheave 26; an evaporator 28 mounted on the engine and having an air inlet side 30 and an oppositely disposed air outlet side in delivery relation with the carburetor 16; and a heat exchanger 32 mounted on support frame 12. The compressor 20 may of course be driven by a separate motor.

These elements of the refrigeration system are mutually interconnected by the following conduits: conduit 34 interconnecting the output side of the compressor 20 with the input side of condenser 18; conduit 36 interconnecting the output side of the condenser 18 with the input side of the evaporator 28 and adapted to pass the liquid refrigerant from the condenser through the heat exchanger 32; and conduit 38 interconnecting the output side of the evaporator 28 with the input side of compressor 20 and adapted to pass the refrigerant through the heat exchanger 32.

The refrigeration system further includes a back pressure regulator valve 42 in conduit 38, an expansion valve 44 in conduit 36, and a temperature modulating valve 46 disposed in control relation with valve 42. Valve 46, in turn, is under the control of temperature responsive means comprising a liquid filled bulb 47 disposed in the carburetor 16, and a capillary tube 48 interconnecting said bulb with valve 46. In the event that engine 10 is operated as a gas admission engine, rather than as a carburetted engine, the sensory portion of said temperature responsive means will be disposed in some suitable portion of the air intake manifold system.

When the engine 10 is operating, the engine-driven belt 24 operates the compressor 20, and the hot compressed refrigerant is delivered through conduit 34 in a saturated vapor condition to the condenser 18. The condensed refrigerant is then passed through conduit 36, is further cooled in exchanger 32, and passes through the expansion valve 44 and through the evaporator 28 where it picks up heat from the intake air which is aspirated through the intake side 30 of the evaporator and through the carburetor 16 to the intake manifold 14. The refrigerant issuing from the evaporator then passes through the back pressure regulator valve 42 and is transmitted through the exchanger 32 to the compressor in a saturated vapor state.

The temperature responsive means, comprising the bulb 47 disposed within carburetor 16 and capillary tube 48, in control relation to modulating valve 46 is adapted to vary the setting of the valve 46 and variation of the setting of valve 46 effects a variation of the setting of regulator valve 42, thereby varying the back pressure condition of the expanded refrigerant within the evaporator and thus varying the degree of cooling of the intake air. If the ambient temperature of the air increases, the setting of valve 46 is adjusted to induce a change in setting of valve 42 to lower the back pressure, thereby increasing the cooling capacity of the evaporator and enabling the air to be delivered to the manifold 14 at a pre-selected temperature, as for example, 40° F. The manner in which this is done will be clear from inspection of Figure 2. An increase in the ambient temperature of the air causes the liquid within the closed system of bulb 47, tube 48 and upper chamber of valve 46 to expand, thereby further opening valve 46. Such opening of valve 46 enables more refrigerant vapor to bypass valve port 42a while also causing the valve element 42b to be further moved away from port 42a. The back pressure is thereby lowered. On the other hand, if there is a drop in the ambient temperature of the air, the setting of valve 46 is adjusted to induce a change in setting of valve 42 to raise the back pressure, thereby decreasing the cooling capacity of the evaporator. Such a raise in back pressure is produced by a drop in pressure within the upper chamber of valve 46 which results in closing movement of valve 46 and closing movement of valve element 42b with respect to port 42a. In this manner, a constant pre-selected intake air temperature is obtained, thus enabling the engine to operate at a constant and a higher than normal maximum horsepower output, despite changes in the ambient temperature of the air, and the engine is thus enabled to operate with no reduction in its brake thermal efficiency.

Expansion valve 44 is provided with means to adjust the setting thereof in response to the temperature of the refrigerant entering evaporator 28, said means comprising a liquid-filled bulb 44a and line 44b communicating with a diaphragm chamber in the valve. A lowering of refrigerant temperature causes closing movement of the valve element of valve 44 while a raising of refrigerant temperature causes opening movement of said valve element.

In Figure 2, the dotted flow lines indicate a saturated vapor condition of the refrigerant, while the solid flow lines indicate a liquid condition.

Means are provided to automatically shut off the compressor 20 in the event that the temperature of the inlet air to the engine drops below the range of control of the modulating valve 46, and to thereafter start the compressor when the temperature of the inlet air increases to the minimum control temperature of valve 46. Such means, shown in Figure 4, comprise: a friction clutch 50 adapted to clutch a sheave 52 to engine-driven shaft 54 so that belt 24 may drive the compressor drive sheave 26; an air cylinder 56 having a piston arm 58 adapted, when solenoid valve 60 is open and air pressure supply line 62 is in communication with cylinder 56, to actuate clutch control arm 64 and connect sheave 52 to shaft 54 through clutch 50, and further adapted, when valve 60 is closed, to retract control arm 64 and thereby de-clutch sheave 52 and shaft 54; current supply means 66 for solenoid valve 60 under the control of switch 68; and capillary tube 70 in control relation with switch 68 and connected to the aforementioned temperature sensitive bulb 47 located in the inlet air stream. In the event that a separate motor drive is provided for the compressor 20, means, such as 66—70 may be employed to effect energization and de-energization of said motor.

Figure 3 illustrates a further embodiment of the engine air cooling system of the invention which is adapted for use when a fuel, such as propane, is used for the engine 10. In such event, the fuel itself may be used as the refrigerant, with the compressor and condenser elements of the system of Figure 1 being eliminated. The propane, under pressure, is fed from the fuel tank, not shown, through conduit 136, expansion valve 144, the core evaporator 128 which is disposed within the path of the intake air stream, and then to the temperature modulating valve 146, which is under the control of capillary tube 148, and back pressure regulator valve 142. The propane is then passed through conduit 138 to the carburetor or gas admission system of the engine.

When fuels, such as propane, are used as refrigerants, the air temperature control problem is made less difficult, since the refrigeration effect is directly proportional to the engine load for the reason that the rate of fuel flow is proportional to the engine load.

As will be obvious, with respect to the above-described embodiments of the invention, the reduction in temperature of the intake air causes an increase in the weight of the air per unit volume, which means that each volume of air delivered into the combustion chamber of the naturally aspirated engine contains a greater quantity of oxygen for combustion than would be otherwise available. In turn, the increased oxygen content enables more fuel to be admitted into the combustion chamber while still obtaining complete combustion. Thus, the engine operates at a horsepower output greater than its normal, or rated, maximum.

The lowering of the temperature of the intake air produces the following additional operational advantages: detonation, or pre-ignition, is inhibited since the temperature of the combustion mixture at the beginning of the compression stroke is lower than normal, thus resulting in a lower temperature for the compressed combustion mixture prior to actual combustion; the engine is enabled to operate at the same thermal load with a higher power output as it operated at the normal maximum power output rating prior to installation of the refrigeration system, or, stated otherwise, the engine operates at a higher horsepower output while its component parts remain at substantially the same temperature conditions as would have obtained prior to installation of the refrigeration unit; and some of the water vapor in the intake air is condensed out of the air within the evaporator, thereby providing for jacket water makeup on portable engine units and making the operation of such engine units fully independent of outside water supply sources.

What is claimed is:

1. In combination with a naturally aspirated internal combustion engine having an air intake manifold, means for increasing the maximum horsepower output of said engine consisting of a refrigeration system including compressor, condenser and evaporator elements, with said evaporator element constituting the inlet for the air intake manifold of said engine.

2. In combination with a naturally aspirated internal combustion engine having an air intake manifold means for increasing the maximum horsepower output of said engine consisting of a refrigeration system including compressor, condenser and evaporator elements, said evaporator element being disposed at the air inlet end of said manifold whereby the naturally aspirated air induced into said manifold passes through said evaporator element in heat transfer relation therewith, means for operating said compressor element, and control means responsive to the temperature condition of the air entering said air intake manifold means to actuate and de-actuate said compressor element operating means.

3. In combination with a naturally aspirated internal combustion engine having an air intake manifold means for increasing the maximum horsepower output of said engine consisting of a refrigeration system including compressor, condenser and evaporator elements, a refrigerant conduit system operably interconnecting said elements, said evaporator being disposed at the air inlet end of said manifold whereby the naturally aspirated air induced into said manifold passes through said evaporator element in heat transfer relation therewith, said conduit system including an expansion valve at the input side of said evaporator element, a back pressure regulator valve at the output side of said evaporator element, a modulating valve in control relation with said regulator valve, and means including a sensory element in association with said manifold adapted to control said modulating valve in response to the temperature condition of the air entering said manifold.

4. The combination set forth in claim 3 further comprising means responsive to a manifold air temperature within the range of temperature control of said modulating valve to drive said compressor and responsive to a manifold air temperature below the range of temperature control of said modulating valve to shut off said compressor.

5. In combination with a naturally aspirated internal combustion engine having an air intake manifold and adapted to be operated with propane fuel, means for increasing the maximum horsepower output of said engine consisting of a refrigerating system including an evaporator disposed at the air inlet end of said manifold whereby the naturally aspirated air induced into said manifold passes through said evaporator element in heat transfer relation therewith, a storage tank for propane fuel, and conduit means for passing propane from said tank through said evaporator and into mixed relation with the air which has passed through said evaporator.

6. The combination set forth in claim 5, said conduit means including an expansion valve at the input side of said evaporator, a back pressure regulator valve at the output side of said evaporator, a modulating valve in control relation with said regulator valve, and means including a sensory element in association with said manifold adapted to control said modulating valve in response to the temperature condition of the air entering said manifold.

References Cited in the file of this patent

UNITED STATES PATENTS

| | | |
|---|---|---|
| Re. 19,350 | Munters et al. | Oct. 23, 1934 |
| 2,145,678 | Backstrom | Jan. 31, 1939 |
| 2,571,256 | King | Oct. 16, 1951 |